United States Patent [19]
Hansen et al.

[11] 3,879,733
[45] Apr. 22, 1975

[54] METHOD AND APPARATUS FOR DETERMINING NEAR-FIELD ANTENNA PATTERNS

[75] Inventors: Peder M. Hansen; John W. Rockway, both of San Diego, Calif.

[73] Assignee: The United States of America as represented by the Secretary of the Navy, Washington, D.C.

[22] Filed: Oct. 1, 1973

[21] Appl. No.: 402,659

[52] U.S. Cl............................ 343/100 AP; 343/703
[51] Int. Cl............................................ G01r 29/10
[58] Field of Search..................... 343/100 AP, 703

[56] References Cited
UNITED STATES PATENTS

| | | | |
|---|---|---|---|
| 2,548,836 | 4/1951 | Worthington, Jr. | 343/100 AP |
| 3,166,748 | 1/1965 | Shanks et al. | 343/100 AP |

*Primary Examiner*—T. H. Tubbesing
*Assistant Examiner*—Richard E. Berger
*Attorney, Agent, or Firm*—R. S. Sciascia; G. J. Rubens; H. Fendelman

[57] ABSTRACT

A cost-effective and practical technique for obtaining far-field patterns of complex radiating or receiving structures such as ships, aircraft, or shore site antennas. Actual phase and amplitude measurements are obtained in the near-field and then they are processed in a digital computer using theoretical Z-matrix numerical techniques to calculate the far-field patterns by solving the matrix for the current distribution on the structure. By using near-field measurements, the method is significantly less expensive than either modeling or complete computer solutions, yet the results achieved are highly accurate.

6 Claims, 4 Drawing Figures

METHOD AND APPARATUS FOR DETERMINING NEAR-FIELD ANTENNA PATTERNS

BACKGROUND OF THE INVENTION

The far-field patterns of complex antennas are generally obtained from actual physical measurements. Full-scale measurements of a ship, for example, are taken by flying a helicopter over the ship, which obviously entails great expense. Limited pattern measurement ranges are available for ships, but again, the process is very expensive and is generally limited to low-angle radiation. Theoretical calculations can be done on a computer using numerical techniques to analyze wire grid models, for example. However, large complicated problems such as ships are impractical to model at the present time due to the limitations on computer storage and the relative expense of computer time.

Consequently a technique which is cost-effective and yet accurate is necessary to calculate antenna patterns of ships, airplanes, shore sites and other complex structures. The techniques should enable fewer personnel to take all measurements required for a structure in a short time without interfering with the normal operation of the structure. The concept to be disclosed herein provides such a cost-effective method for determining the antenna pattern of any complicated antenna structure. The use of the technique will result in large savings due to its relative simplicity and limited computer processing required.

SUMMARY OF THE INVENTION

A practical and cost-effective technique is disclosed for obtaining accurate far-field patterns of complicated structures such as ships, airplanes, or shore site antennas. Actual near-field amplitude and phase measurements are first obtained from the structure in question. The data is then combined with numerical techniques and processed by digital computer apparatus to accurately and inexpensively calculate the far-field patterns. The near-field measurements obtained are used with a Z-matrix to solve for the current distribution. The current matrix is found by inverting the Z-matrix and the desired antenna characteristics are calculated from the current distribution in a classical manner. The technique can be performed by a single operator who takes all measurements required for a structure in a relatively short time and without interfering with the normal operation of the structure. Since near-field measurements are used to provide information for analysis less information about the antenna structure needs to be included in the model, consequently a much rougher model of the object can be used in the computer and still achieve good accuracy.

OBJECTS OF THE INVENTION

It is the primary object of the present invention to provide a cost-effective, relatively simple, and practical technique for accurately calculating the far-field antenna patterns of complex structures such as ships, airplanes, and shore site antennas.

Other objects, advantages and novel features of the invention will become apparent from the following detailed description of the invention when considered in conjunction with the accompanying drawings.

DESCRIPTION OF THE PREFERRED EMBODIMENT

Figure 1:
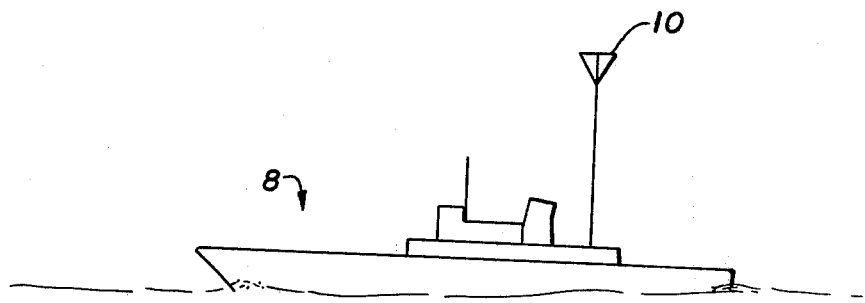
FIG. 1 is a simplified illustration of a complex antenna structure such as are commonly found on naval ships.

As stated previously, the technique to be disclosed herein comprises a relatively simple and practical technique for calculating far-field patterns of complex structures such as ships, airplanes or shore site antennas, etc. The inventive concept will be disclosed with reference to a structure comprising a naval ship 8 having located thereon an antenna structure 10. It should be appreciated that FIG. 1 is highly simplified and that in actuality a great number of antenna structures are found on most present-day navy ships.

Figure 2:
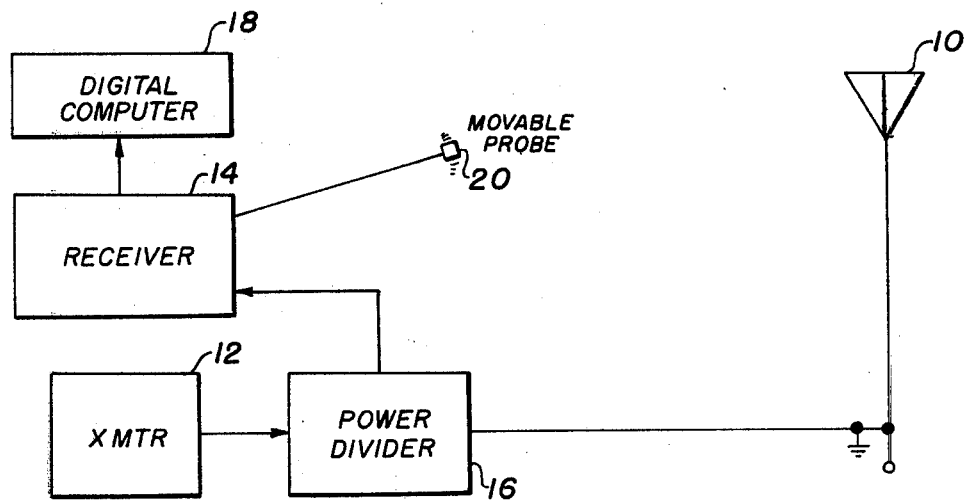
FIG. 2 is a simplified block diagram of apparatus embodying the disclosed concept.

FIG. 2 illustrates the apparatus for practicing the inventive concept to be disclosed. The antenna 10 is excited by energy from a transmitter 12. The transmitter 12 is connected to the antenna and to the receiver 14 through a power divider 16. The receiver 14 is fed the output of the probe 20, and the output of the receiver 14 is in turn applied to a digital computer 18.

The method to be disclosed herein comprises the taking of near-field measurements by means of the movable probe 20 as the structure 10 is excited by RF energy from the transmitter 12 or from any other stable source. In operation, a single operator using the apparatus of FIG. 2 can obtain the required amplitude and phase measurements in the near-field of the antenna 10. The measurements are taken at random points in the operational environment of the structure. The orientation or position of each point relative to the structure is noted, and measurements are taken by the probe for the three possible, mutually-orthogonal polarizations.

The near-field phase and amplitude measurements, the coordinates of the point of measurement, and the polarization are fed as input data to the computer 18 which is programmed to calculate the [Z] matrix for a rough model of the structure in question.

Figure 3:
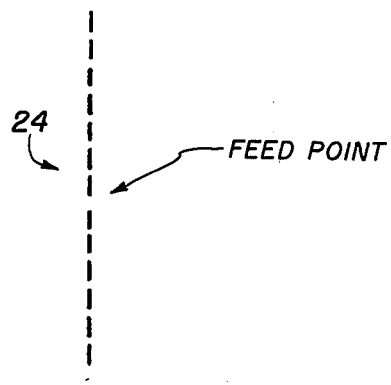
FIGS. 3 and 4 represent simplified illustrations of dipoles for purposes of illustrating the concept to be disclosed herein.

As is known, conducting objects can be modeled as a series of wire segments, as is well known to those skilled in the art. For purposes of illustration FIG. 3 represents a simple dipole modeled in this manner. More complex surfaces can be similarly modeled by wire grids, spider webs, small plates, etc. For example, the ship structure 8 of FIG. 1 could be modeled by a number of box structures for purposes of practicing the inventive concept.

The Pocklington type integral equation for the current on such a model results in a matrix equation disclosed, for example, in Advanced Antenna Theory, by Sergei A. Schelkunoff, p.p. 130–131, 1952, of the following form:

$$[Z_{ij}][I_i] = [E_i]$$

where:

$I_i$ is a current on the ith wire segment;

$Z_{ij}$ is a mutual impedance between the ith and the jth segments; and, $E_i$ is the tangential electric field at the ith segment.

The tangential field, $E_i$, is equal to zero unless the element is driven; accordingly this is the basic boundary condition to be satisfied. For the simple dipole illustrated in FIG. 3, the matrix equation reduces to the following:

$$[Z_{ij}][I_i] = \begin{bmatrix} 0 \\ 0 \\ \vdots \\ E_n \\ \vdots \\ 0 \\ \vdots \\ 0 \end{bmatrix}$$

where
where $E_n$ is the electric field at the driving point.

In this case, the Z-matrix is calculated, and the E-vector is known. Consequently, the solution for [I] is obtained by inverting [Z] and multiplying it by [E]:

$$[I] = [Z]^{-1}[E]$$

The [I]-matrix represents an approximation of the current distribution on the structure and once it is known, it can be used to calculate all of the antenna parameters of interest.

The method and concept described above, thus comprises the taking of several measurements of the near zone electric field of the antenna 10 by means of the movable probe 20. The measurements obtained are used with a different Z-matrix to solve for the currents (current distribution). The formulation appears as follows:

$$\begin{bmatrix} Z_{ij} \end{bmatrix}^{-1} \begin{bmatrix} E_1 \\ E_2 \\ \vdots \\ E_n \end{bmatrix} = \begin{bmatrix} I_i \end{bmatrix}$$

where $E_1$ represents measured values, and the $Z_{ij}$ represents the mutual impedance between segments and the points where measurements are taken.

Again, the current matrix is solved by inverting the [Z]-matrix, and the desired antenna far-field patterns are determined from the resulting current distribution since the far-field patterns are substantially equal to those of the rough model. Since near-field measurements are used to provide data, less information about the antenna structure needs to be included in the model. The number of measurements required is a direct function of the size of the structure. Consequently, the desired accuracy can be obtained using a much rougher model of the object.

Figure 4:
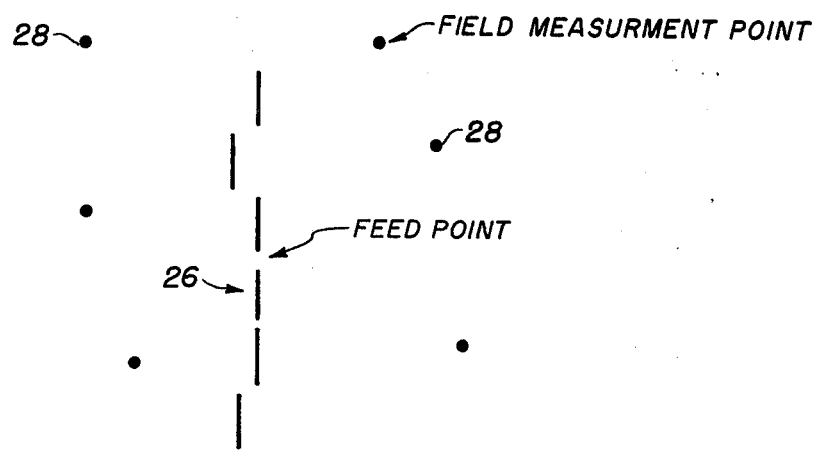

The simple dipole problem would be solved using much longer segments, or segments that were not exactly in the proper position because not all of the boundary conditions are satisfied, as illustrated in FIG. 4. Some of the elements may have non-zero tangential electric fields corresponding to sources. These sources appear in order to drive the segment to provide a current that will produce the proper near-field.

In theory, if the fields on a closed surface enclosing two antennas are equivalent, then the far-fields from the antenna will be the same even though the antennas themselves are different. The method outlined above forces the near-field of the rough model to be the same as the actual structure, thus providing a good approximation for the desired far-field calculations.

It can be appreciated that the technique disclosed makes feasible the determination of antenna patterns of complicated structures such as ships, aircraft, etc. Furthermore, the method can also be used with unknowns such as shore site antennas wherein unknown parameters might include the descriptive parameters of the ground. Using the present method, the measurements obtained will compensate for the unknown quantities, and thus provide accurate patterns.

Obviously, it is far less expensive than either full-scale modeling (or otherwise) or complete computer solutions since near-field measurements are combined with computer calculations to provide highly accurate far-field patterns.

Although only the Pocklington-type equation has been mentioned, it should be appreciated that the method of combining near-field measurements with computer solutions of the integral equation can be applied to the Hallen-type integral equation disclosed, for example, in *The Theory of Linear Antennas*, by Ronald King, p. 76, 1956, or any other integral equation arising from other areas of interest such as fluids, etc.

Obviously many modifications and variations of the present invention are possible in the light of the above teachings. It is therefore to be understood that within the scope of the appended claims the invention may be practiced otherwise than as specifically described.

What is claimed is:

1. A method for determining far-field radiation patterns of a complex structure and comprising the steps of exciting said structure with RF energy from a stable source; measuring phase and amplitude for three mutually-orthogonal polarizations at a plurality of known points in the near-field of said structure; converting the measured phase and amplitude, the coordinates of said points relative to said structure, and the polarization of said corresponding measurements into digital data; programming digital computer apparatus to calculate the impedance matrix of a rough model of said structure; feeding said digital data into said apparatus for inverting said impedance matrix and thereby providing the current distribution of said structure; converting said current distribution in said apparatus into said far-field radiation patterns.

2. The method of claim 1 wherein said stable source comprises a transmitter.

3. The method of claim 2 wherein said phase and amplitude measurements are made by means of a movable probe connected at its output to a receiver.

4. The method of claim 1 wherein said impedance matrix is calculated using the Pocklington equation.

5. A method for determining far-field patterns of a complex radiating structure comprising the steps of measuring phase and amplitude in the near-field of said structure, processing the resultant measurements in digital computer apparatus to determine the impedance matrix of said structure and to invert said matrix to determine the current distribution of said structure.

6. Apparatus for determining the far-field pattern of a complex radiating structure comprising:

RF energy source means connected to feed RF energy to said structure;

measuring means for measuring in three mutually-orthogonal polarizations the phase and amplitude of said structure at known points in the near-field of said structure;

digital computer apparatus connected to the output of said measuring means for processing said measurements by means of the Pocklington equation to provide the current distribution on said structure whereby said far-field patterns can be determined.

* * * * *